United States Patent [19]

Van Buren et al.

[11] Patent Number: 4,544,913
[45] Date of Patent: Oct. 1, 1985

[54] FAST INDEXING ENCODER APPARATUS

[75] Inventors: Phillip D. Van Buren, Scottsdale; Edgar J. Abt, Tempe, both of Ariz.

[73] Assignee: Motorola, Inc., Schaumburg, Ill.

[21] Appl. No.: 534,994

[22] Filed: Sep. 22, 1983

[51] Int. Cl.[4] ............................................. G08C 9/08
[52] U.S. Cl. ............................................. 340/347 P
[58] Field of Search ............... 340/347 P; 235/61 PD, 235/94 R, 117 R, 139 R, 144 R

[56] References Cited

U.S. PATENT DOCUMENTS

| | | |
|---|---|---|
| 84,391 | 11/1868 | Sprague . |
| 153,415 | 7/1874 | Winn . |
| 615,207 | 11/1898 | Babcock . |
| 2,060,978 | 11/1936 | Deutsch . |
| 2,468,406 | 4/1949 | Mora . |
| 4,010,464 | 3/1977 | Wires et al. ..................... 340/347 P |
| 4,031,386 | 6/1977 | Recker ............................ 340/347 P |
| 4,331,866 | 5/1982 | Batzdorff ........................ 340/347 P |

Primary Examiner—Vit W. Miska
Attorney, Agent, or Firm—Eugene A. Parsons

[57] ABSTRACT

A plurality of Geneva gears including rings each having Geneva elements formed in the outer periphery thereof and rotatably mounted for individual rotation, each Geneva gear having associated therewith a fixed electrical contact and a wiper contact for engaging a plurality of fixed conductors as the Geneva gear rotates. A driving crank associated with each Geneva gear and driven through a frictional clutch from a single control, said Geneva gears having a locking mechanism associated therewith so that only one Geneva gear is free to rotate at any one time. The locking means is operated by a ratchet and pawl that operates from a single locking control.

4 Claims, 6 Drawing Figures

FAST INDEXING ENCODER APPARATUS

BACKGROUND OF THE INVENTION

In the context of this invention, electromechanical encoders provide the means to convert a unique mechanical setting into a unique electrical interpretation, thereby providing a one-on-one mapping function. In some encoder designs the operator must cause the mechanism to advance sequentially through all numbers smaller than the desired number in order to obtain the prescribed set point. This is not an objectionable practice for set points near the lower end of the range, but when the set point is a considerable distance upscale then the time to set the mechanism could become objectionable. A second potential drawback to sequential advance of setting would occur if electrical contact make/break action is associated with each change of the least significant digit. In that instance one element of the contact pair could be subjected to rapid wear or fatigue loading. The Fast Indexing Encoder Apparatus provides the means to avoid those objections.

SUMMARY OF THE INVENTION

The present invention pertains to a fast indexing encoder apparatus wherein a plurality of rotatably mounted Geneva gears each have associated therewith a fixed contact and a sliding contact which engages one of a plurality of conductors as the Geneva gear is rotated, the Geneva gear being rotated by means of frictionally driven cranks, and selection means including a common control coupled to said plurality of Geneva gears and further including locking means preventing the rotation of all but one selected Geneva gear for selectively rotating each of said Geneva gears so that the associated sliding contact is engaged with the desired conductor.

It is an object of the present invention to provide new and improved fast encoder apparatus utilizing Geneva gears for the purpose of effecting a motion dwell period at each successive potential setting of the mechanism thereby providing visual feedback to the operator that the mechanism elements are aligned for proper encoding.

It is a further object of the present invention to provide new and improved fast indexing encoder apparatus which is relatively simple to manufacture and operate and which always provides visual feedback information to the operator regarding the degree of accuracy with which the mechanism was set.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
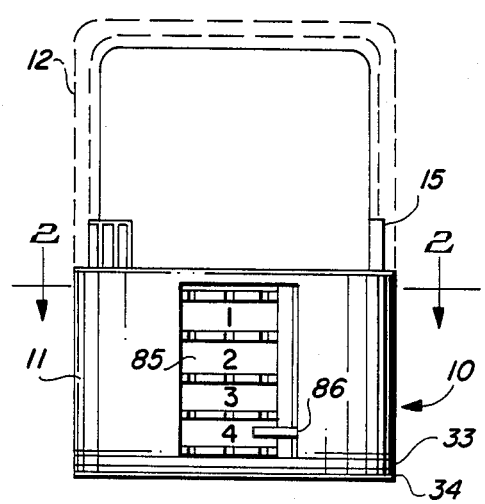
FIG. 1 is a view in top plan of an assembled encoder apparatus incorporating the present invention.

Referring specifically to FIG. 1, fast indexing encoder apparatus generally designated 10 is illustrated. The encoder apparatus 10 includes a housing 11 and a cup-shaped portion 12 (shown in phantom) rotatably attached to the housing 11 and forming a common control for indexing the encoder apparatus. A depressably mounted button (not shown) is coupled to a locking element 15 whose gear teeth engage the internal gear teeth of the cup-shaped portion 12 to prevent rotation of the portion 12 when the button 15 is in its extended, or normal, position. The locking element 15 also operates in conjunction with the portion 12 to index the encoder, as will be described presently.

Figure 2:
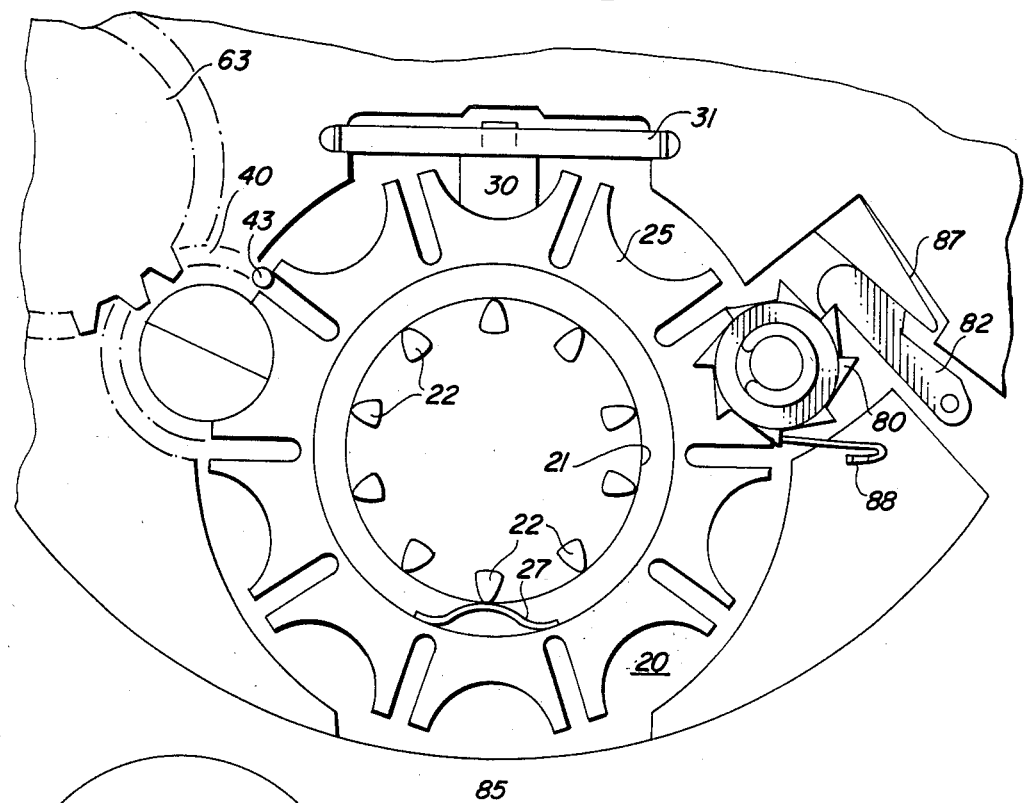
FIG. 2 is an enlarged view of the assembled encoder apparatus illustrated in FIG. 1, generally as seen from the line 2—2 in FIG. 1, portions thereof removed.

Referring specifically to FIG. 2, the encoder and selection means is illustrated in greater detail. The encoder, generally designated 20, includes a centrally located encoder cylinder 21 having a plurality of elongated conductors 22 mounted therein. The encoder cylinder 21 and conductors 22 are formed in a fashion similar to the cylinder 14–19 and conductors 15 in the copending patent application filed of even date herewith, entitled "Fast Indexing Encoder Apparatus" and assigned to the same assignee. A plurality of rings having Geneva elements formed in the outer periphery thereof to form Geneva gears 25 are rotatably mounted around the cylinder 21 with each ring having a sliding contact 27 associated therewith. As the Geneva gear 25 rotates the sliding contact 27 engages each of the conductors 22 in turn. Each Geneva gear 25 also has a fixed contact 30 associated therewith which is engaged in a printed circuit board 31 to prevent the rotation thereof and provide an external connection therewith. The fixed contact 30 and sliding contact 27 are electrically connected so that rotation of the Geneva gear 25 sequentially connects the fixed contact 30 to each of the conductors 22. External connections to the conductors 22 are available at a disc shaped printed circuit board 33 and encoder end cap 34 illustrated in FIG. 1. The construction and assembly of the Geneva gears 25, sliding contacts 27 and fixed contacts 30 are similar to the construction and assembly of the rings 20, sliding contact 27 and fixed contacts 26 in the above described patent application. It will of course be understood that many other embodiments might be devised but that the embodiment illustrated in this and the copending application are illustrated because of their simplicity and ease in construction.

Figure 3:
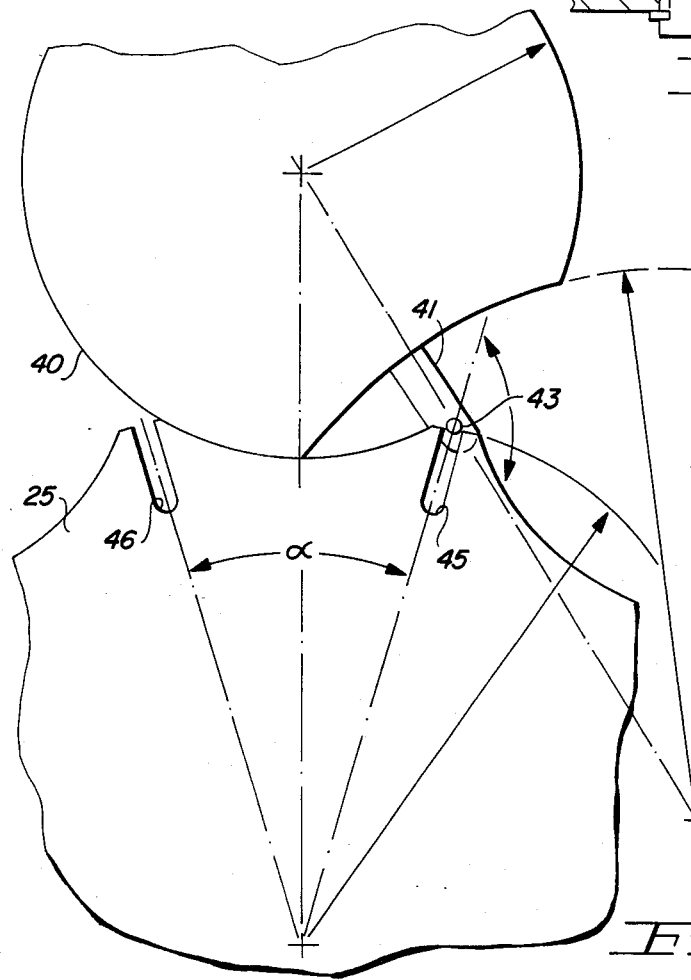
FIG. 3 is a view of a Geneva gear and driving crank, illustrating various pertinent measurements.

Each Geneva gear 25 has associated therewith a driving crank member 40, illustrated in detail in FIG. 3. Each Geneva gear includes a plurality common Geneva elements. In the present embodiment each Geneva gear includes ten such elements (ten conductors 22 in the encoder cylinder 21). Thus, the angle alpha between Geneva elements is 36 degrees. The driving crank member 40 is formed as a partial disc with the removed portion having an elongated crank 41 extending radially outwardly therefrom and a pin 43 affixed in the crank 41 so as to extend outwardly therefrom. The crank member 40 is mounted adjacent the associated element on Geneva gear 25 and the radius thereof is equal to the radius of the concave arc between the slots in the Geneva gear. The driving member 40 is mounted so as to lie generally within the concave arc between the slots of the Geneva gear 25. As the driving crank member 40 is rotated one revolution, the pin 43 in the crank 41 engages a slot and rotates the Geneva gear 25 thirty-six degrees. As illustrated in FIG. 3, one clockwise rotation of the crank member 40 moves the slot 45 to the present position of the slot 46. Because the Geneva gear 25 and crank member 40 cooperate to move the Geneva gear 25 a specific amount for each rotation, indexing of the present encoder apparatus is very precise and simple.

Figure 4:
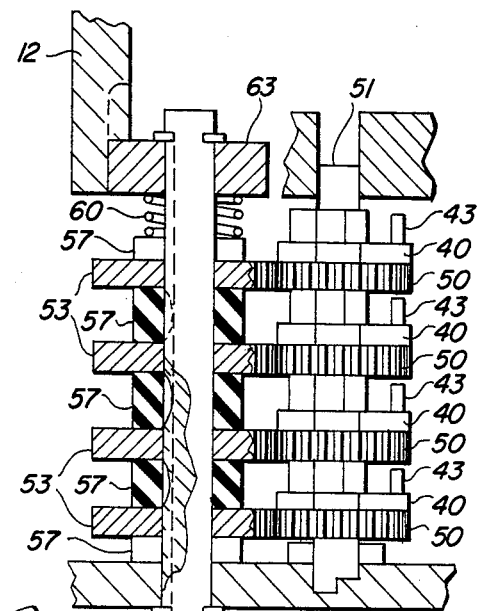
FIG. 4 is a sectional view as seen from the line 4—4 in FIG. 2.

Each Geneva gear 25 has a crank member 40 associated therewith, which crank members 40 are driven by friction driven means illustrated in FIG. 4. Each crank member 40 has a gear 50 as an integral part thereof and rotates on a shaft 51. Each gear 50 has a frictionally driven gear 53 meshed therewith. The gears 53 have a round mounting hole therethrough and are positioned on a shaft 55 for free rotation thereabout. Shaft 55 is equipped with a keyway. Friction discs 57 are mounted between and in frictional engagement with the driving gears 53. The friction discs 57 are equipped with internal keys which slidably engage the discs 57 to the shaft 55 so that discs 57 rotate with the shaft 55 but are permitted to slide along shaft 55. A coil spring 60 is mounted over the shaft 55 to supply pressure to the discs 57 for frictional driving of the gears 53 as the shaft 55 rotates. The friction discs 57 and spring 60 operate as a friction clutch to cause rotation of the gears 53 with the shaft 55 when the gears 50 are free to rotate but to allow the gears 53 to stop rotation when the gears 50 are stopped. A driving gear 63 is keyed to the upper end of the shaft 55 for producing rotation thereof. A gear 63 engages the gear in the inner surface of the portion 12 of the housing 10, which forms a common control for all of the encoder gears. Thus, rotation of the portion 12 of the housing 10 rotates all of the gears 50 and, hence, the Geneva gears 25 through the crank members 40.

Figure 6:
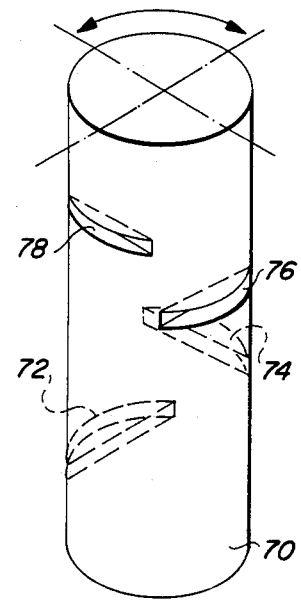
FIG. 6 is a view in perspective of the locking rod.
Figure 5:
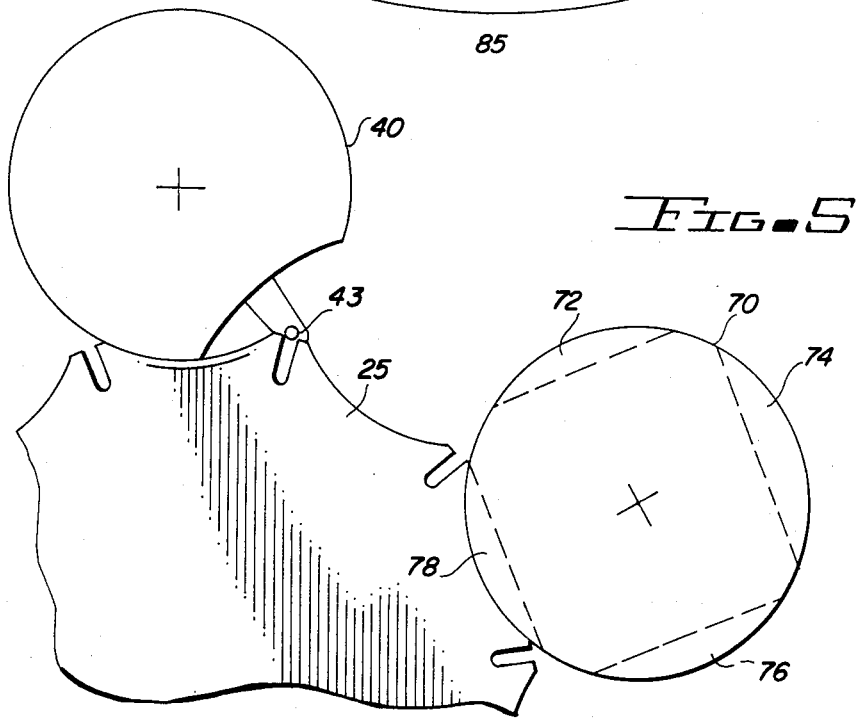
FIG. 5 is a view of the Geneva gear and locking mechanism illustrating pertinent dimensions thereof.

In the proper indexing of the encoding apparatus, it is essential that only a selected Geneva gear 25 rotate to a preselected position. To attain this selective rotation, locking means illustrated in FIGS. 2, 5 and 6 are utilized. The locking means includes an elongated rod 70 rotatably mounted in the housing 10 adjacent the Geneva gears 25. The rod 70, referring to FIG. 5, has a diameter approximately equal to the diameter of the disc 40 forming each of the crank members. That is, the radius of the rod 70 is approximately equal to the radius of the concave arc between the radial slots in each of the Geneva gears 25. Four slots 72, 74, 76 and 78 are formed in the rod 70 at axially spaced apart intervals equivalent to the axial distance between the Geneva gears 25 and radially separated a distance equal to 360 degrees divided by the number of Geneva gears 25. In the present embodiment four Geneva gears 25 are utilized and, therefore, four slots are required with a radial spacing of 90 degrees. The rod 70 is mounted so that when the slot 78, for example, is positioned adjacent a Geneva gear 25, the adjacent Geneva gear is free to rotate while the three remaining Geneva gears are locked in position by the rod 70. Rotating the rod 70 ninety degrees unlocks the next Geneva gear 25 in its turn. In this manner all four Geneva gears 25 can be sequentially unlocked for rotation by the portion 12 of the housing 10.

The rod 70 has a ratchet gear 80 affixed thereto adjacent the inner end thereof. A pawl 82 is associated with the ratchet 80 and is connected to the locking element 15 and thence to the button (not shown) for operation therewith. As the button and locking element 15 are operated the pawl 82 rotates the ratchet 80 and the rod 70 to sequentially unlock the four Geneva gears 25 to allow the setting thereof. For the ratchet arrangement shown in FIGS. 2 and 6, the button must be depressed twice to achieve one index of rod 70. An anti-rotate spring 88 aids in the ratchet indexing and spring 87 maintains contact of the pawl 82 with the teeth of ratchet 80. It should be noted that the portion 12 of the housing 10 can be rotated in either direction for rapid indexing of the Geneva gears 25. Also, the housing 10 has a viewing port 85 formed therein, see FIG. 1, for viewing the indices associated with the Geneva gears 25. Also, an indicator 86 may be linked to the ratchet 80 for lateral movement therewith to indicate the specific Geneva gear 25 being indexed.

Thus, fast indexing encoder apparatus is described and illustrated which requires less electrical connections than prior art structures and is simple to manufacture as well as operate. Further, because of the use of Geneva gears the indexing is fast and precise.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. Fast indexing encoder apparatus comprising:
   a plurality of rotatable mounted members each individually rotatable, each of said members including a Geneva gear formed in an outer periphery thereof;
   each of said members having a fixed electrical contact associated therewith;
   each of said members further having an electrical wiper contact mounted for rotation therewith and electrically connected to said fixed contact;
   a plurality of electrical conductors mounted adjacent said members for sequential engagement with said wiper contacts of each of said members as said members are rotated, said conductors being further mounted so that each wiper engages only one conductor at any time;
   Geneva gear driving means mounted in engagement with the Geneva gears formed in said plurality of members and including a common control for rotating a selected one of said plurality of members in response to operation of said common control; and
   locking means mounted adjacent said plurality of members and including a single control for engaging and preventing rotation of all but a selected one of said plurality of members in response to the operation of said single control.

2. Fast indexing encoder apparatus as claimed in claim 1 wherein said Geneva gear driving means includes friction driven means, engaged with each of said plurality of members, for allowing slippage of each of said friction driven means engaged with a member prevented from rotating by said locking means.

3. Fast indexing encoder apparatus as claimed in claim 1 wherein the number of Geneva elements in each Geneva gear equals the maximum number of conductors in said plurality of electrical conductors.

4. Fast indexing encoder apparatus as claimed in claim 1 wherein the locking means includes an elongated, rotatably mounted rod having a slot formed therein for each of the members in said plurality, the slots being positioned so that rotation of said rod sequentially aligns only one of said members and the associated slot to unlock said aligned member and allow rotation thereof.

* * * * *